United States Patent
Cai et al.

(10) Patent No.: US 10,931,109 B2
(45) Date of Patent: Feb. 23, 2021

(54) CONTINGENCY BASED LOAD SHEDDING SYSTEM FOR BOTH ACTIVE AND REACTIVE POWER

(71) Applicant: Schweitzer Engineering Laboratories, Inc., Pullman, WA (US)

(72) Inventors: Niannian Cai, Pullman, WA (US); Abdel Rahman Khatib, Pullman, WA (US); Niraj Kiritkumar Shah, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 7 days.

(21) Appl. No.: 16/245,062

(22) Filed: Jan. 10, 2019

(65) Prior Publication Data

US 2020/0227915 A1    Jul. 16, 2020

(51) Int. Cl.
*G05B 19/042* (2006.01)
*H02J 3/14* (2006.01)

(52) U.S. Cl.
CPC .............. *H02J 3/14* (2013.01); *G05B 19/042* (2013.01); *G05B 2219/2639* (2013.01); *Y02B 70/3225* (2013.01); *Y04S 20/222* (2013.01)

(58) Field of Classification Search
CPC ...... H02J 3/14; H02J 13/0006; G05B 19/042; G05B 2219/2639
See application file for complete search history.

(56) References Cited

U.S. PATENT DOCUMENTS

| | | | |
|---|---|---|---|
| 3,849,637 A | 11/1974 | Caruso | |
| 4,916,328 A | 4/1990 | Culp | |
| 5,436,510 A | 7/1995 | Gilbert | |
| 6,204,642 B1 | 3/2001 | Lawson | |
| 6,492,801 B1 | 12/2002 | Sims | |
| 6,608,635 B1 | 8/2003 | Mumm | |
| 7,698,233 B1 | 4/2010 | Edwards | |

(Continued)

FOREIGN PATENT DOCUMENTS

| | | |
|---|---|---|
| CN | 101545953 | 1/2011 |
| DE | 10200733 | 7/2003 |
| EP | 1381132 | 9/2010 |

OTHER PUBLICATIONS

Ziping Ding et al., "Dynamic Simulation-Based Analysis of a New Load Shedding Scheme for a Notional Destroyer-Class Shipboard Power System," IEEE Transactions on Industry Applications, vol. 45, No. 3, May/Jun. 2009, pp. 1166-1174 (Ding) (Year: 2009).*

(Continued)

*Primary Examiner* — Christopher E. Everett
(74) *Attorney, Agent, or Firm* — Bradley W. Schield

(57) ABSTRACT

The present disclosure relates to a computationally efficient technique for determining loads to shed based on both active and reactive power. For example, a monitoring and control system may receive electrical measurements of a power system. The monitoring and control system may determine an active power and a reactive power of each bus in the power system based on the received electrical measurements. The monitoring and control system may send a command to trip at least one breaker to cause the at least one breaker to shed a load based at least in part on both the active power and the reactive power consumed by each bus in the power system.

18 Claims, 6 Drawing Sheets

(56) References Cited

U.S. PATENT DOCUMENTS

| | | |
|---|---|---|
| 8,131,383 B2 | 3/2012 | Pearson |
| 8,248,060 B2 | 8/2012 | Schweitzer |
| 8,604,803 B2 | 12/2013 | Dooley |
| 8,606,372 B1 | 12/2013 | Harris |
| 9,519,301 B2 | 12/2016 | Bartlett |
| 2002/0091503 A1 | 7/2002 | Carrillo |
| 2003/0042876 A1 | 3/2003 | Sadafumi |
| 2003/0088809 A1 | 5/2003 | Gulati |
| 2004/0164717 A1 | 8/2004 | Thompson |
| 2005/0099747 A1* | 5/2005 | Zima ................... G05B 13/048 361/62 |
| 2005/0285574 A1 | 12/2005 | Huff |
| 2006/0208574 A1* | 9/2006 | Lasseter ................... H02J 3/38 307/69 |
| 2007/0162189 A1 | 7/2007 | Huff |
| 2007/0168088 A1 | 7/2007 | Ewing |
| 2007/0219755 A1 | 9/2007 | Williams |
| 2007/0239372 A1 | 10/2007 | Schweitzer |
| 2007/0239373 A1 | 10/2007 | Nasle |
| 2008/0074810 A1 | 3/2008 | Guzman-Casillas |
| 2008/0086239 A1* | 4/2008 | Zhang ....................... H02J 3/14 700/295 |
| 2008/0215302 A1* | 9/2008 | Nasle ...................... G06F 30/20 703/13 |
| 2009/0085407 A1 | 4/2009 | Venkatasubramanian |
| 2009/0113049 A1* | 4/2009 | Nasle ...................... G06F 30/13 709/224 |
| 2009/0299664 A1* | 12/2009 | Zhang ....................... G05F 1/70 702/65 |
| 2010/0312414 A1 | 12/2010 | Kumar |
| 2011/0004425 A1 | 1/2011 | Schweitzer |
| 2011/0022245 A1 | 1/2011 | Goodrum |
| 2011/0054709 A1 | 3/2011 | Son |
| 2011/0320058 A1 | 12/2011 | Rietmann |
| 2012/0123602 A1 | 5/2012 | Sun |
| 2012/0232710 A1 | 9/2012 | Warner |
| 2012/0310434 A1 | 12/2012 | Taft |
| 2012/0310559 A1 | 12/2012 | Taft |
| 2013/0035885 A1 | 2/2013 | Sharon |
| 2013/0066480 A1* | 3/2013 | Glavic ...................... H02J 3/24 700/295 |
| 2013/0074513 A1 | 3/2013 | Mueller |
| 2013/0166085 A1 | 6/2013 | Cherian |
| 2014/0001847 A1 | 1/2014 | Khandelwal |
| 2014/0100705 A1 | 4/2014 | Shi |
| 2014/0148966 A1* | 5/2014 | Salama ...................... H02J 3/00 700/298 |
| 2015/0077133 A1 | 3/2015 | Fischer |
| 2015/0088439 A1* | 3/2015 | Coffrin ...................... H02J 3/00 702/60 |
| 2015/0241894 A1 | 8/2015 | Bartlett |
| 2015/0244170 A1 | 8/2015 | Bartlett |
| 2015/0244171 A1 | 8/2015 | Bartlett |
| 2016/0274606 A1* | 9/2016 | Sun ........................... G06N 5/02 |
| 2018/0034317 A1 | 2/2018 | Khatib |
| 2020/0041548 A1* | 2/2020 | Deng ................... H02J 13/0006 |

OTHER PUBLICATIONS

R. Mageshvaran and T. Jayabarathi, "GSO based optimization of steady state load shedding in power systems to mitigate blackout during generation contingencies," Ain Shams Engineering Journal, vol. 6, No. 1, pp. 145-160, Mar. 2015.

F. Sayed, S. Kamel and O. Abdel-Rahim, "Load shedding solution using multi-objective teaching-learning-based optimization," 2018 International Conference on Innovative Trends in Computer Engineering (ITCE), Aswan, 2018, pp. 447-452.

R. M. Larik, M. W. Mustafa, A. O. Otuoze, O. O. Mohammed and A. H. Sule, "A new technique of load shedding to stabilize voltage magnitude and fast voltage stability index by using hybrid optimization," ARPN Journal of Engineering and Applied Sciences, vol. 13, No. 8, pp. 2734-2745, Apr. 2018.

H. Gao, Y. Chen, Y. Xu, and C.-C. Liu, "Dynamic load shedding for an islanded microgrid with limited generation resources," IET Generation, Transmission & Distribution, vol. 10, No. 12, pp. 2953-2961, May 2016.

S. S. Reddy, "Multi-Objective Based Congestion Management Using Generation Rescheduling and Load Shedding," in IEEE Transactions on Power Systems, vol. 32, No. 2, pp. 852-863, Mar. 2017.

Abdel Rahman Khatib, Mahipathi Appannagari, Scott Manson, and Spencer Goodall; "Load Modeling Assumptions: What is Accurate Enough?" 62nd Annual Petroleum and Chemical Industry Technical Conference, Houston, TX Oct. 5-7, 2015.

POWERMAX® Solutions: Power Management Systems for Industries Remedial Action Schemes for Utilities; Schweitzer Engineering Laboratories, Inc. Mar. 20, 2017.

SEL POWERMAX® Power Management for Industrials; Schweitzer Engineering Laboratories, Inc. Aug. 13, 2018.

SEL POWERMAX® Guideform Specification; Schweitzer Engineering Laboratories, Inc. Feb. 21, 2012.

Kai Sun, Da-Zhong Zheng, and Qiang Lu, "Splitting Strategies for Islanding Operation of Large-Scale Power Systems Using OBDD-based methods," in IEEE Transactions on Power Systems, vol. 18, No. 2, pp. 912-923, May 2003.

Mark Grant, "Foxboro SCADA Systems Load Shedding and Electrical Monitoring Control Systems Design in Industrial Process Plants", 2012, retrieved on May 5, 2016 from http://iom.invensys.com/EN/pdfLibrary/WhitePaper_LoadSheddingandElectricalMonitoring.pdf.

* cited by examiner

CONTINGENCY BASED LOAD SHEDDING SYSTEM FOR BOTH ACTIVE AND REACTIVE POWER

TECHNICAL FIELD

The present disclosure relates generally to electric power delivery systems and, more particularly, to shedding loads based on active and reactive power.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
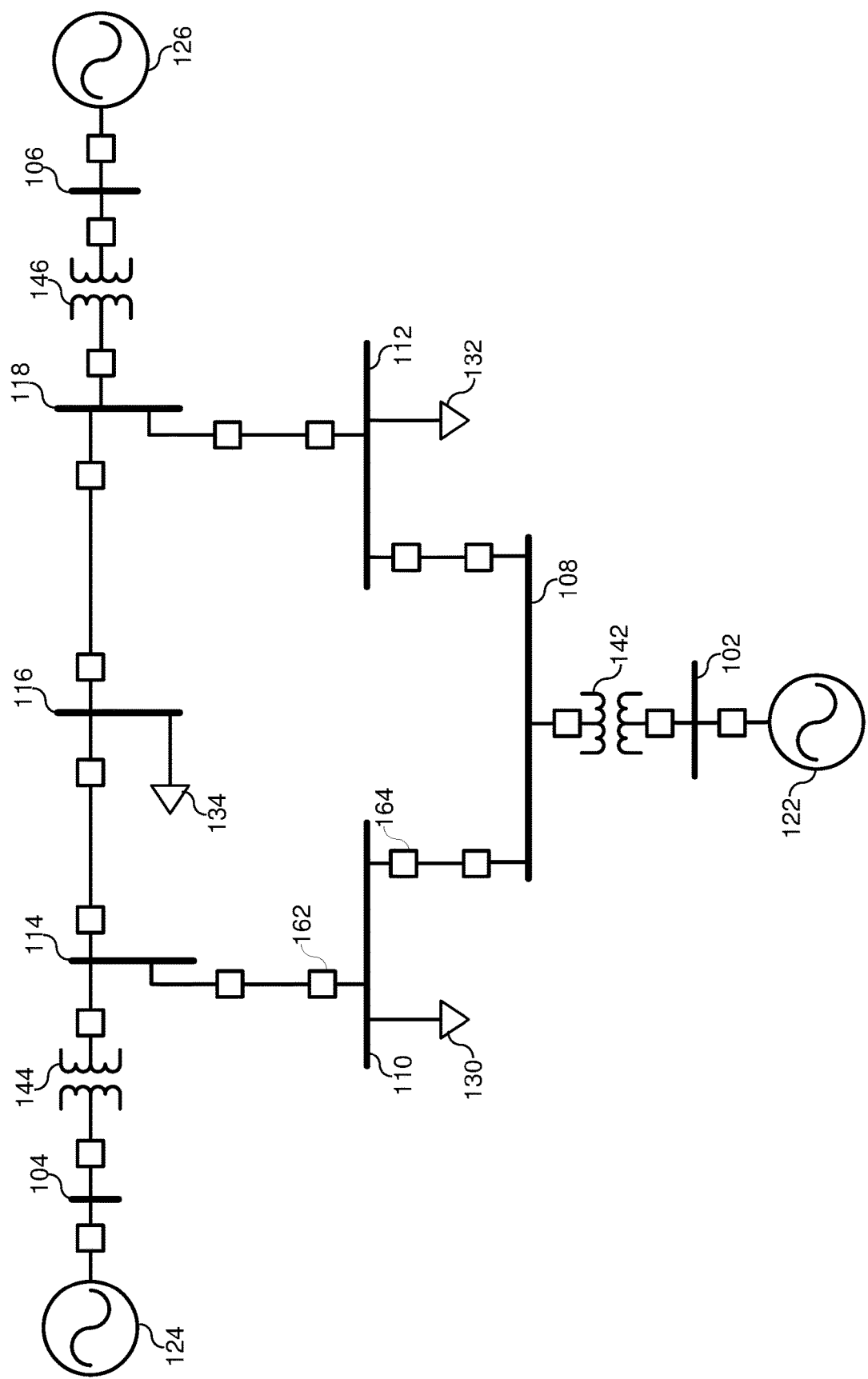
FIG. 1 illustrates a simplified one-line diagram of an electric power delivery system, in accordance with embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems are used to transmit electric power from generation to load. Electric power delivery monitoring and control systems may be used to monitor the power being delivered and to make control decisions regarding such electric power delivery systems. For example, electric power delivery monitoring and control systems may take one or more control actions upon occurrence of a contingency in the system. A contingency may refer to loss and/or failure of equipment on the electric power delivery system, an overcurrent, undercurrent, overvoltage, or undervoltage on the electric power delivery system, or the like. These contingencies may be caused by faults, generator failure, transformer failure, or any other event on the power delivery system. In some cases, the contingency may impact the power being generated and/or the power being demanded. Electric power delivery monitoring and control systems may perform control action(s), such as shedding loads and/or shedding power generation, to balance power generation with power demand upon occurrence of the contingency to maintain operation of the electric power delivery system.

Decisions to shed load may be made based on active power being delivered and consumed or the frequency of the current/voltage. For example, if active power being generated and delivered to the loads is less than the active power demands of the loads, one or more loads may be shed from the electric power delivery system to balance active power being generation with active power demand.

However, making these decisions based on active power alone may result in voltage variations on the power delivery system due to changes in reactive power. For example, a contingency may cause a system to lose both active and reactive power provided by a generator. Following the loss of the active power and reactive power from the generator, shedding a load to balance active power generation with demand may leave the system deficient/excess in reactive power. Further, the extent of the difference between the reactive power supplied and reactive power demanded may not be known. This difference (e.g., excess or deficiency) between reactive power supplied and reactive power demanded may cause undesirable voltage behaviors. For instance, shedding less reactive load may cause voltages on one or more buses in the power delivery system to decrease below a desired operating limit due to a difference between reactive power being demanded and reactive power being delivered created by a contingency. Depending on the extent of the difference (e.g., deficiency/excess) between reactive power supply and reactive power demand, various bus voltages of the electric power delivery system may decrease or increase beyond desired operating limits causing voltage protection trips and/or voltage collapses to occur. As such, not accounting for reactive power result in outages on the power system.

As described below, a monitoring and control system may shed loads of a power delivery system based on both active power and reactive power when there is insufficient reactive power generation for the demand, for instance, following an occurrence of a contingency that resulted in losing reactive power generation. For example, the monitoring and control system may use linear optimization to model the power system using an objective function and a set of constraints, such as equality constraints and inequality constraints. In some embodiments, the set of equality constraints may include a piecewise linear approximation of a change in phase angle between the voltages of buses to approximate power flow equations of active power and reactive power. The inequality constraints may include voltage constraints of the buses in the power delivery system. These voltage constraints may be received by the monitoring and control system via user inputs. The inequality constraints may further include active power and reactive power constraints based on the operating properties of the generators in the power delivery system. The set of constraints may be used to account for the operating modes of the generators in the power delivery system. For example, the monitoring and control system may include constraints that depend on the active power mode (e.g., isochronous mode, droop mode, constant MW mode) and the reactive power mode (e.g., voltage mode, constant MVAR mode, power factor (PF)

mode, voltage droop mode) of a generator. The objective function may include a function that maximizes the active power while accounting for load priority (e.g., using a weight factor). By shedding loads based on both active power and reactive power, the monitoring and control system may protect the power delivery system from changes in bus voltages that exceed operating limits due to deficiencies in reactive power generation.

FIG. 1 illustrates a simplified one-line diagram of a topology of an electric power delivery system 100, according to one embodiment. The topology may include the connections between the equipment/components of the electric power delivery system. The illustrated diagram is similar to the IEEE 9-bus system and is used herein as an example. The system includes a first bus 102 in electrical communication with a first generator 122, which is in electrical communication with a fourth bus 108 through a first transformer 142. A second generator 124 is in electrical communication with a second bus 104, which is in electrical communication with a seventh bus 114 through a second transformer 144. A third generator 126 is in electrical connection with a third bus 106, which is in electrical communication with a ninth bus 118 through a third transformer 146. The seventh bus 114 is in electrical communication with the ninth bus 118 via the eighth bus 116. The seventh bus 114 is in electrical communication with a fifth bus 110. The ninth bus 118 is in electrical communication with sixth bus 112. Both the fifth bus 110 and the sixth bus 112 are in electrical communication with the fourth bus 108. The fifth bus 110 is in electrical communication with a first load 130. The sixth bus 112 is in electrical communication with a second load 132. The eighth bus 116 is in electrical communication with a third load 134.

For ease of discussion in the voltage assessment prediction described hereunder, Table A shows the translation of the element numbers illustrated in FIG. 1 and the element names according to the IEEE 9-bus system:

TABLE A

| FIG. 1 Element Number | IEEE 9-Bus System Elements |
|---|---|
| 102 | Bus 1 |
| 104 | Bus 2 |
| 106 | Bus 3 |
| 108 | Bus 4 |
| 110 | Bus 5 |
| 112 | Bus 6 |
| 114 | Bus 7 |
| 116 | Bus 8 |
| 118 | Bus 9 |
| 122 | Generator 1 |
| 124 | Generator 2 |
| 126 | Generator 3 |
| 130 | Load A |
| 132 | Load B |
| 134 | Load C |
| 142 | Transformer 1 |
| 144 | Transformer 2 |
| 146 | Transformer 3 |

Figure 2:
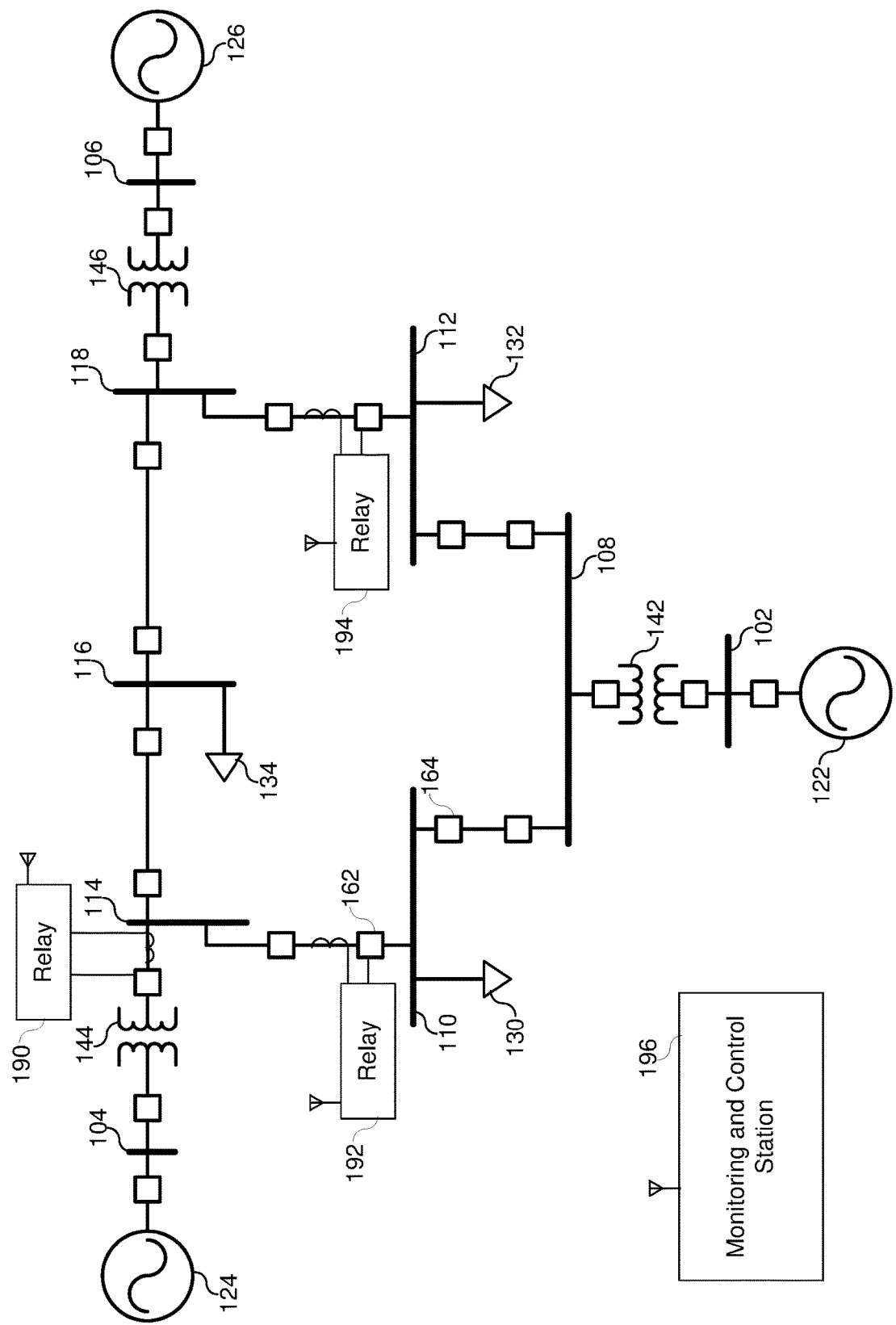
FIG. 2 illustrates a monitoring and control system for the electric power delivery system of FIG. 1, in accordance with embodiments of the present disclosure.

FIG. 2 is a block diagram of a monitoring and control system that may be used for monitoring and control of the electric power system 100 of FIG. 1. The monitoring and control system may include one or more intelligent electronic devices (IEDs). As used herein, an IED (such as relays 190, 192, and 194) may refer to any microprocessor-based device that monitors, controls, automates, and/or protects monitored equipment within system the electric power delivery system 100. Such devices may include, for example, remote terminal units, differential relays, distance relays, directional relays, feeder relays, overcurrent relays, voltage regulator controls, voltage relays, breaker failure relays, generator relays, motor relays, faulted circuit indicators, automation controllers, bay controllers, meters, recloser controls, communications processors, computing platforms, programmable logic controllers (PLCs), programmable automation controllers, input and output modules, digital sample publishing units, merging units, and the like. The term IED may be used to describe an individual IED or a system comprising multiple IEDs.

While FIGS. 1 and 2 illustrate an example power system, any suitable power system may be monitored by the monitoring and control system 196. Further, while three IEDs are shown in FIG. 2, any suitable number of IEDs may be used to monitor, control, and protect various power systems. It is appreciated that the systems and methods described herein may be applied as described and/or with adaptation to a wide variety of electrical system configurations, including but not limited to microgrids, industrial facilities, oil platforms, etc. Each of the IEDs 190, 192, and 194 may monitor operating characteristics of the power system, such as current, voltage, circuit breaker status, and the like, and may communicate operating characteristics with a central monitoring station 196. As explained below, the monitoring and control station 196 may determine both active and reactive power of the buses in the power system from the operating characteristics communicated by the IEDs 190, 192, 194 and provide protective actions to the IEDs 190, 192, and 194 to control the electric power delivery system 100.

Figure 3:
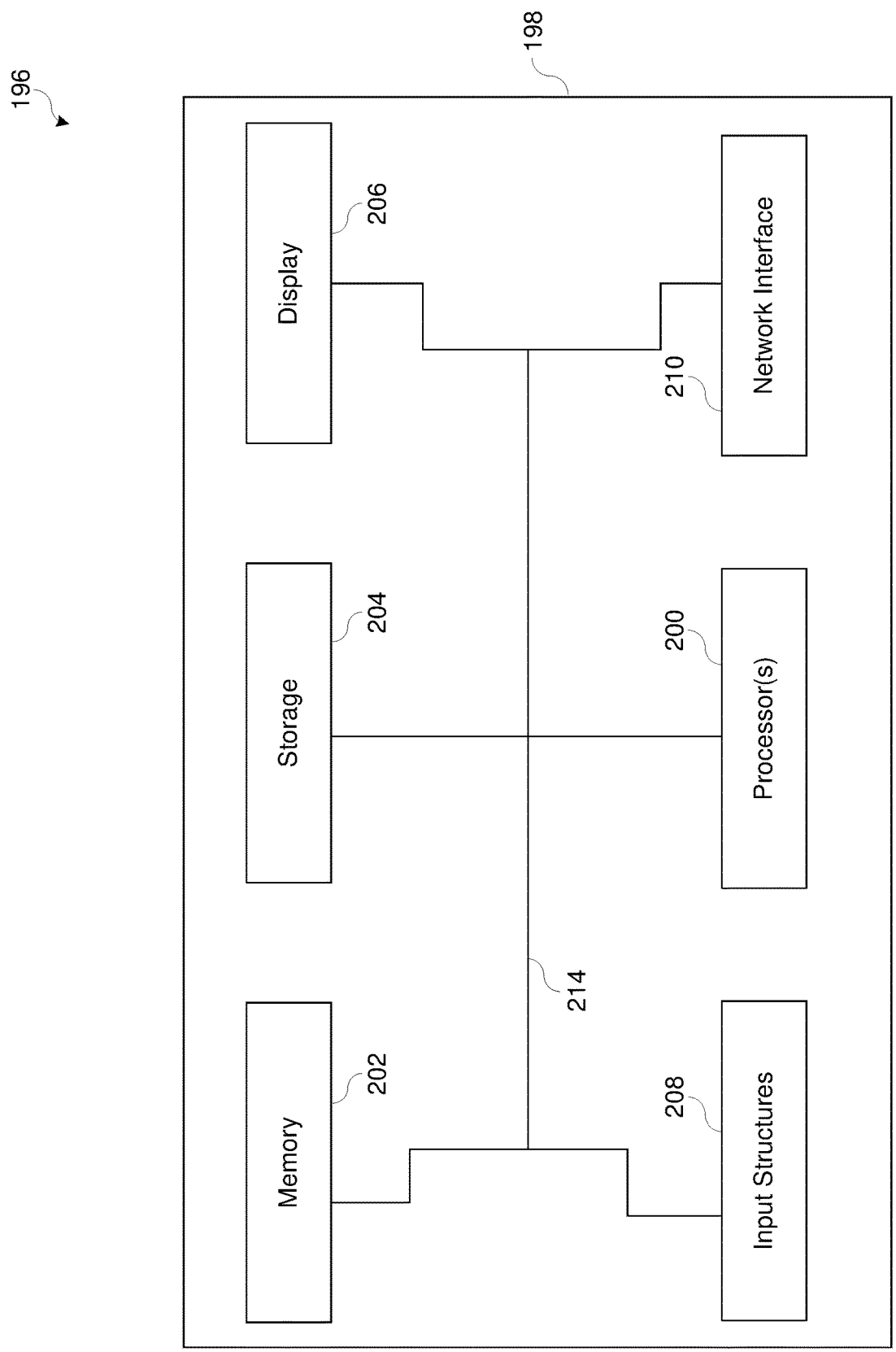
FIG. 3 illustrates a block diagram of the monitoring and control system of FIG. 2, in accordance with embodiments of the present disclosure.

FIG. 3 is a block diagram of the monitoring and control system 196 that may be used to monitor and control the electric power delivery system 100. The monitoring and control system 196 may be located at any suitable location, such as at a power plant of the power generator 122 or at another facility. The monitoring and control system 196 may include one or more electronic device(s) 198 according to an embodiment of the present disclosure, which may include, among other things, one or more processor(s) 200, memory 202, nonvolatile storage 204, a display 206, input structures 208, and network interface 210. The various functional blocks shown in FIG. 3 may include hardware elements (including circuitry), software elements (including computer code stored on a computer-readable medium) or a combination of both hardware and software elements. It should be noted that FIG. 3 is merely one example of a particular implementation and is intended to illustrate the types of components that may be present in the electronic device 198. The processor 200 may be a single contained processing module or may be incorporated wholly or partially within any of the other elements within the electronic device 190.

In the electronic device 198 of FIG. 3, the processor 200 may be operably coupled, via one or more communication buses 214, with the memory 202 and the nonvolatile storage 204 to perform various algorithms. Such programs or instructions executed by the processor 200 may be stored in any suitable article of manufacture that includes one or more tangible, computer-readable media at least collectively storing the instructions or routines, such as the memory 202 and the nonvolatile storage 204. The memory 202 and the nonvolatile storage 204 may include any suitable articles of manufacture for storing data and executable instructions, such as random-access memory, read-only memory, rewritable flash memory, hard drives, and optical discs. In some embodiments, the nonvolatile storage 204 and/or the processor 200 may be implemented as hardware components, such as via discrete electrical components, via a field programmable gate array (FPGA), and/or via one or more application specific integrated circuits (ASICs) and may be referred to generally as processing circuitry. Further, the instructions or routines may be provided to the processor 200 to produce a machine, such that the instructions, when executed by the processor 200, implement the operations/acts specified in the flowchart described below with respect to FIGS. 5A and 5B.

The input structures 208 of the electronic device 198 may enable a user to interact with the electronic device 198 (e.g., activating a control action) via the display 206. The display 206 may be any suitable display that allows users to view images generated on the electronic device 198, such as a liquid crystal display (LCD), organic light emitting diode (OLED) display, or the like.

According to various embodiments, the monitoring and control system 196 may comprise one or more of a variety of types of systems. For example, central monitoring system 196 may include a supervisory control and data acquisition (SCADA) system and/or a wide area control and situational awareness (WACSA) system. The monitoring system 196 may provide control operations for the power delivery system 100. In some embodiments, intelligent electronic devices (IEDs) may be in communication with the monitoring system 196. The IEDs may communicate over various media such as a direct communication or over a wide-area communications network. The network interface 210 may include, for example, communication circuitry suitable to communicate wirelessly with the IEDs. The monitoring system 196 may receive signal(s) from one or more of the power generators 122, 124, and 126, one or more of the loads 130, 132, and 134, and/or one or more other electronic devices, such as one or more IEDs, on the power delivery system 100.

As mentioned above, following a contingency in which losing of power generation occurs, power systems may shed loads based on active power alone without accounting for reactive power in the system. However, if the reactive power produced does not meet the reactive power demanded when shedding the loads, one or more voltages of buses in the electric power delivery system 100 may decrease (e.g., collapse) below desired operating limits. As such, there is a need in the field to shed load based on both active power and reactive power when there is insufficient reactive power generation for the demand, for instance, following an occurrence of a contingency that resulted in loss of reactive power generation.

Referring to FIG. 1, as an example, each of the generators 122, 124, and 126 may be producing 10 MW and 5 MVAR for a total of 30 MW and 15 MVAR. In this example, the load 130 may consume 10 MW and 0 MVAR, the load 132 may consume 10 MW and 5 MVAR, and the load 134 may consume 10 MW and 10 MVAR If the generator 124 is disconnected (e.g., opening of a circuit breaker by relay 190), then the system is generating 20 MW and 10 MVAR via the remaining generators 122 and 126. In a system that does not shed load based on reactive power, the generator may shed load 130 to balance the active power produced with the active power consumed.

However, shedding the load 130 while providing power to loads 132 and 134 may cause a deficiency in the reactive power produced as compared to the reactive power consumed, which may cause bus voltages to decrease. The monitoring system 196 may determine which loads to shed based on constraints, such as equality constraints and inequality constraints. In this example, the monitoring system 196 may determine that one or more bus voltages are expected to decrease below a voltage constraint due to deficiencies in reactive power produced. The monitoring system 196 may send a command signal to cause circuit breakers to trip to shed load 132 to cause the voltage of the buses in the power system to operate within the voltage constraints by balancing active power and reactive power demand and supply.

Some of the constraints may be approximations derived from power flow equations. The power flow equations may be stated as:

$$P_k = V_k \sum_{m \in S} V_m (G_{km} \cos \delta_{km} + B_{km} \sin \delta_{km}) \qquad \text{Eq. 1}$$

$$Q_k = V_k \sum_{m \in S} V_m (G_{km} \sin \delta_{km} - B_{km} \cos \delta_{km}) \qquad \text{Eq. 2}$$

where $P_k$ and $Q_k$ are active and reactive power injected into node k, $V_k$ and $V_m$ are voltage magnitudes at buses k and m, S is the set of the buses in the system, $\delta_{km} = \delta_k - \delta_m$, $\delta_k$ and $\delta_m$ are the voltage angles of bus k and bus m, and $G_{km}$ and $B_{km}$ are the active and reactive part of $Y_{km}$, the (k, m)th element of the bus admittance matrix. The voltage magnitudes $V_k$ and $V_m$ may be represented as:

$$V_k = 1.0 + \Delta V_k \qquad \text{Eq. 3}$$

$$V_m = 1.0 \Delta V_m \qquad \text{Eq. 4}$$

where $\Delta V_k$ and $\Delta V_m$ are bus k and bus m voltage deviation from nominal bus voltage 1.0 per unit, and $\cos \delta_{km}$ and $\sin \delta_{km}$ can be represented as:

$$\cos \delta_{km} = 1 - \frac{\delta_{km}^2}{2} + \qquad \text{Eq. 5}$$

$$\sin \delta_{km} = \delta_{km} - \frac{\delta_{km}^3}{6} + \qquad \text{Eq. 6}$$

Considering that $\Delta V$ and $\delta_{km}$ terms may be relatively small, higher order terms or the products of these terms may be removed as shown:

$$P_k \approx \sum_{m \in S}(-B_{km}\delta_m + G_{km}V_m) + \delta_k B_{kk} + \Delta V_k g_{kk} - \frac{1}{2}\sum_{m \in S} G_{km}\delta_{km}^2 \qquad \text{Eq. 7}$$

$$Q_k \approx \sum_{m \in S}(-G_{km}\delta_m - B_{km}V_m) + \delta_k g_{kk} - \Delta V_k b_{kk} + \frac{1}{2}\sum_{m \in S} B_{km}\delta_{km}^2 \qquad \text{Eq. 8}$$

where $g_{kk}$ and $b_{kk}$ are the active and reactive part of the $k^{th}$ diagonal element in the $Y_{bus}$ matrix.

The last terms in the $P_k$ and $Q_k$ equations are in quadratic form and express the active power loss and reactive power loss from the power flow equations. To linearize equations (7) and (8), piecewise linearization may be used.

Figure 4:
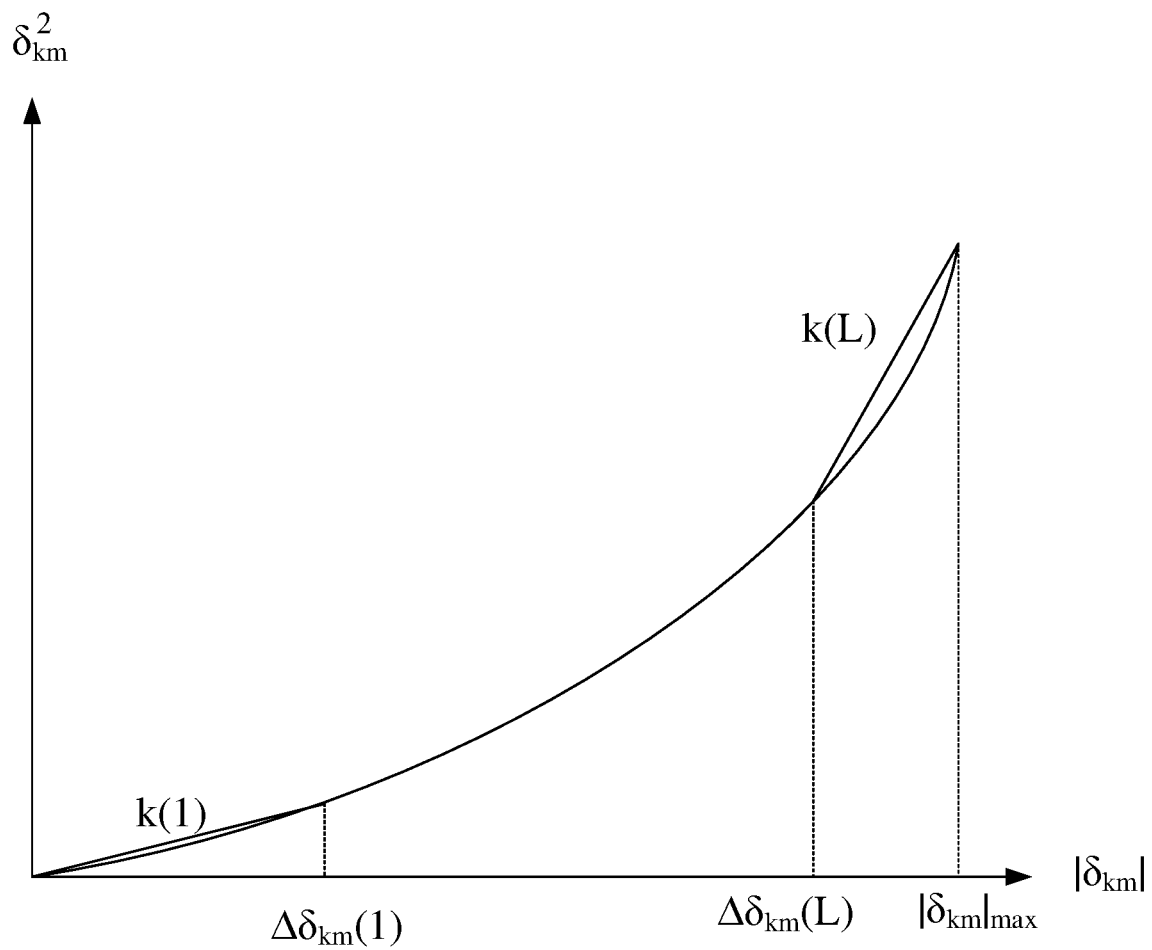
FIG. 4 illustrates a plot of a linearization of a phase angle difference between voltages of buses in the electric power delivery system of FIG. 1, in accordance with embodiments of the present disclosure.

FIG. 4 is a plot of linearization of $\delta_{km}^2$ by L linear segments where k(i) is the slope of the $i^{th}$ segment. $|\delta_{km}|_{max}$ is a constant describing the maximum angle difference between two adjacent buses and may be determined using any suitable known method (e.g., user input, calculation, etc.). Therefore, the expression of $\delta_{km}^2$ is:

$$\delta_{km}^2 = \sum_{i=1}^{L} k(i)\Delta\delta_{km}(i) \qquad \text{Eq. 9}$$

where k(i) is given by the expression:

$$k(i) = (2i-1)\frac{|\delta_{km}|_{max}}{L} \qquad \text{Eq. 10}$$

Further, $\Delta\delta_{km}(i)$ satisfies:

$$|\delta_{km}| = \sum_{i=1}^{L} \Delta\delta_{km}(i) \qquad \text{Eq. 11}$$

As any given $\Delta\delta_{km}(i)$ is less than or equal to the maximum length:

$$0 \leq \Delta\delta_{km}(i) \leq \frac{|\delta_{km}|_{max}}{L} \qquad \text{Eq. 12}$$

To establish the relationship between $\delta_{km}$ and $|\delta_{km}|$ that accounts for the absolute value (e.g., from the positive side ($\delta_{km}^+$) and the negative side ($\delta_{km}^-$)), two non-negative variables $\delta_{km}^+$ and $\delta_{km}^-$ are created and defined as:

$$\delta_{km} = \delta_{km}^+ - \delta_{km}^- \qquad \text{Eq. 13}$$

$$|\delta_{km}| = \delta_{km}^+ + \delta_{km}^- \qquad \text{Eq. 14}$$

where $\delta_{km}^+ \geq 0$ and $\delta_{km}^- \geq 0$.

Hence, the power flow equations may be expressed as:

$$P_k = \sum_{m \in S}(-B_{km}\delta_m + G_{km}V_m) + \qquad \text{Eq. 15}$$
$$\delta_k b_{kk} + \Delta V_k g_{kk} - \frac{1}{2}\sum_{m \in S}\sum_{i=1}^{L} G_{km}k(i)\Delta\delta_{km}(i)$$

$$Q_k = \sum_{m \in S}(-G_{km}\delta_m - B_{km}V_m) + \qquad \text{Eq. 16}$$
$$\delta_k g_{kk} - \Delta V_k b_{kk} + \frac{1}{2}\sum_{m \in S}\sum_{i=1}^{L} B_{km}k(i)\Delta\delta_{km}(i)$$

To quickly and reliably shed load, the monitoring system 198 may model the power system using linear optimization to meet the equality constraints above, meet the inequality constraints of equations (12) and (18)-(21), and to maximize an objective function. In the illustrated embodiment, the objective of the model is to maximize the active power load after a contingency with consideration of higher weights on the higher priority loads. The objective function may be defined as:

$$\text{Max: } \sum_{i=1}^{N_L} W_i * PL_i * Brk_i \qquad \text{Eq. 17}$$

where $N_L$ is the number of loads in the system, $W_i$ is the weight factor of load i, $PL_i$ is the active power of load i, and $Brk_i$ is the breaker status of load i.

The inequality constraints of the load shedding may include equation (12) and equations (18)-(21) stated as follows:

$$PG_i^{min} \leq PG_i \leq PG_i^{max} \qquad \text{Eq. 18}$$

$$QG_i^{min} \leq QG_i \leq OG_i^{max} \qquad \text{Eq. 19}$$

$$V_i^{min} \leq V_i \leq V_i^{max} \qquad \text{Eq. 20}$$

$$0 \leq Brk_i \leq 1 \qquad \text{Eq. 21}$$

where $PG_i^{min}$ and $PG_i^{max}$ are lower and upper limits of active power output of generator i, $QG_i^{min}$ and $QG_i^{max}$ are lower and upper limits of reactive power output of generator i, $V_i^{min}$ and $V_i^{max}$ are lower and upper limits of voltage magnitude of bus i, $PG_i$ and $QG_i$ are the active and reactive power output of generator i, $V_i$ is bus voltage magnitude of bus i, and $Brk_i$ is a breaker status (e.g., open as 0, closed as 1) of Load i.

Figure 5A:
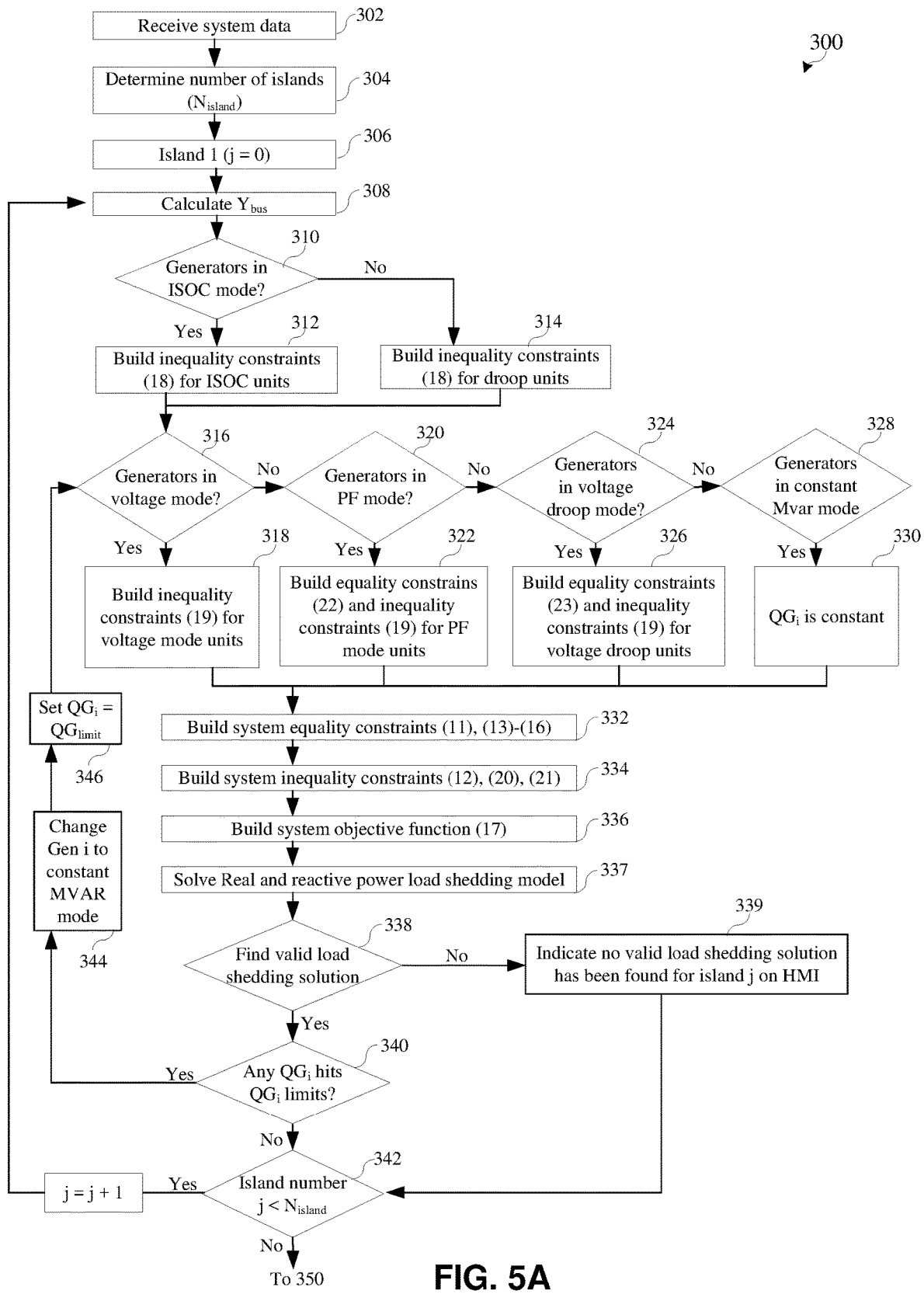
FIG. 5A illustrates a flow diagram of a first part of a process performed by the monitoring and control system of FIG. 2, in accordance with embodiments of the present disclosure.

FIG. 5A is a flow chart of a process 300 that may be performed by the processor 200 of the monitoring and control system 196 in monitoring and control operations of the electric power delivery system 100. The process 300 may be stored as instructions (e.g., code) in the memory 202 and/or the nonvolatile storage 204 to perform the operations described therein. The process 300 may begin with the monitoring and control system 196 receiving system data (block 302). The system data may be received via the input structures 208 from user input, via the communication circuitry from one or more IEDs, or any other suitable method. The system data may include topology (e.g., equipment and connections therebetween), breaker status, line impedance, transformer settings, voltages, currents, generator operating limits, generator operating modes, bus voltage operating limits, and the like. The system data may further include load active power (MW) consumed and load reactive power (MVAR) consumed. That is, the monitoring and control system 196 may receive the load MW and load MVAR consumed on each bus in the electric power delivery system 100. Further, if the power measurements of the load MW and load MVAR are not available, power measurements of substation feeders may be used to calculate load power and reactive power values.

The processor 200 may determine the number of islands in the power delivery system (block 304). For example, an island may refer to a portion of the electric power delivery system 100 that may provide power (e.g., via a distributed generator) without being tied to the electrical power grid. The process 300 may begin with the first island (block 306). The processor 200 may calculate a $Y_{bus}$ admittance matrix for the first island (block 308). As mentioned above, the $Y_{bus}$ admittance matrix may be a matrix of admittances between each bus in the power delivery system 100 that is used to determine the values of the power flow equations (15) and (16).

The processor 200 may determine whether there are generators operating in isochronous mode (diamond 310). This may be a status signal associated with each of the generators in the electrical power delivery system. The status may indicate whether the governor of the generator is operating in isochronous mode, droop mode, constant MW mode, or the like. If there are generators operating in isochronous mode in the electrical power delivery system 100, PG of isochronous machines may be variables constrained by inequality equation (18) (block 312) while $PG_i$ of other machines operated in droop mode or constant MW mode may be set as a constant. If there are no isochronous machines in the electric power delivery system 100, the $PG_i$ of droop generators may be variables constrained by inequality constraint (18) (block 314) while $PG_i$ of constant MW mode generators may be set as constants.

The processor 200 may determine inequality constraints based on the reactive power mode of the generator. For example, the monitoring and control system 196 may receive a status indicating a reactive power mode of the exciter of the generator. This may be another field measured status that includes whether the generator is operating in voltage mode, constant MVAR mode, power factor (PF) mode, or voltage droop mode. If a generator is operating in voltage mode (diamond 316), the generator terminal voltage $V_i$ may be set to a constant while $QG_i$ may be set to a variable that satisfies equation (19) (block 318). If $QG_i$ reaches $QG_i^{min}$ or $QG_i^{max}$, $QG_i$ may be fixed at a limit value and $V_i$ may become a variable that satisfies equation (20). If a generator is operating in power factor mode (diamond 320), $QG_i$ may be set to satisfy equality constraint in equation (22) and inequality constraint of equation (19) (block 322).

$$QG_i = \text{sign}(PF_i) * PG_i \sqrt{\frac{1}{PF_i^2} - 1} \quad \text{Eq. 22}$$

where $PF_i$ is the power factor reference value for generator i and $PF_i \neq 0$. If $QG_i$ reaches $QG_i^{min}$ or $QG_i^{max}$, the generator may not continue operating in power factor mode and $QG_i$ may be set to be equal to the constrained limit, which may involve removing equality constraint (22) from the set of constraints for the generator.

If a generator is operating in voltage droop mode (diamond 324), $QG_i$ may be set to satisfy equality constraint in equation (23) and inequality constraint of equation (19) (block 326).

$$QG_i = QG^{ref} + \frac{V^{ref} - V_i}{R_{vdroop}} \quad \text{Eq. 23}$$

where $QG^{ref}$ and $V^{ref}$ are reactive power and voltage reference values of voltage droop control, $R_{vdroop}$ is a droop value of voltage droop control. If $QG_i$ reaches $QG_i^{min}$ or $QG_i^{max}$, the generator may not maintain voltage droop control and $QG_i$ may be set to be equal to the constrained limit, which may involve removing equality constraint (23) from the set of constraints for the generator.

If a generator is operating in constant MVAR mode (diamond 328), $QG_i$ may be set as a constant value and $V_i$ may be a variable that satisfies equation (20) (block 330).

Upon determining the constraints from the active power and reactive power operating modes of the generators, the processor 200 may build system equality constraints of equations (11) and (13)-(16) (block 332). For example, the processor 200 may determine the active power and reactive power of each of the buses based on piecewise linearization of the phase angle differences between voltages of each of the buses in the electric power delivery system 100.

The processor 200 may then build system inequality constraints of equations (12), (20), and (21) (block 334). For example, the monitoring and control system 196 may receive, voltage settings indicating a desired voltage minimum and maximum of each of the buses in the power delivery system 100. Further, the monitoring and control system 196 may receive breaker status settings (e.g., whether each breaker is open or closed). The breaker status settings may be received, for example, from IEDs monitoring the breakers. Further, the processor 200 may limit $\Delta\delta_{km}(i)$ based on user settings, such as $|\delta_{km}|_{max}$ and L. These settings may be, for example, pre-defined during installation of the monitoring and control system 196.

The processor 200 may build the system objective function of equation (17) (block 336). That is, the processor 200 may determine a maximum utilization of active power considering the weights factor of each of the loads. For example, loads of higher priority may be set by the user to have greater weight factors in the objective function.

The processor 200 may then solve the active and reactive power load shedding model (block 337) in which the constraints are satisfied to maximize the objective function. That is, the processor 200 may determine load shedding topology (e.g., a breaker status of each breaker) in the electric power delivery system 100 that maximizes the objective function while meeting the equality constraints and the inequality constraints. In the example given above with respect to FIG. 1, the maximizing of the objective function may depend on, for example, the voltages of the buses as compared to the voltage constraints, the active power and reactive power operating modes of the generators, the active power and reactive power generation of the generators, the generator operating limits, the topology, the current breaker status, the line impedance, and the like. By maximizing the objective function, the most loads with consideration of priority may be powered without causing voltages of one or more buses to violate voltage constraints due to reactive power deficiencies. If a valid load shedding solution that satisfies the constraints is found (diamond 338), the processor 200 may then proceed to block 340. Otherwise, the processor 200 may send a signal indicating that no valid load shedding solution has been found for island j (block 339).

The process 300 may continue by determining if the reactive power $QG_i$ of any generator reaches or exceeds the $QG_i$ limits of equation (19) (block 340). If a $QG_i^{max}$ or a $QG_i^{min}$ limit is reached, the processor 200 may reevaluate the active and reactive power load shedding model by changing the generator i to constant MVAR mode (block 344) and setting $QG_i$ to be the $QG_i^{max}$ or $QG_i^{min}$ limit reached. The steps 316-340 may then be performed with the $QG_i$ set to the constant value. If the $QG_i$ limits are not reached, the steps may then be repeated for each of the remaining islands (block 342).

Figure 5B:
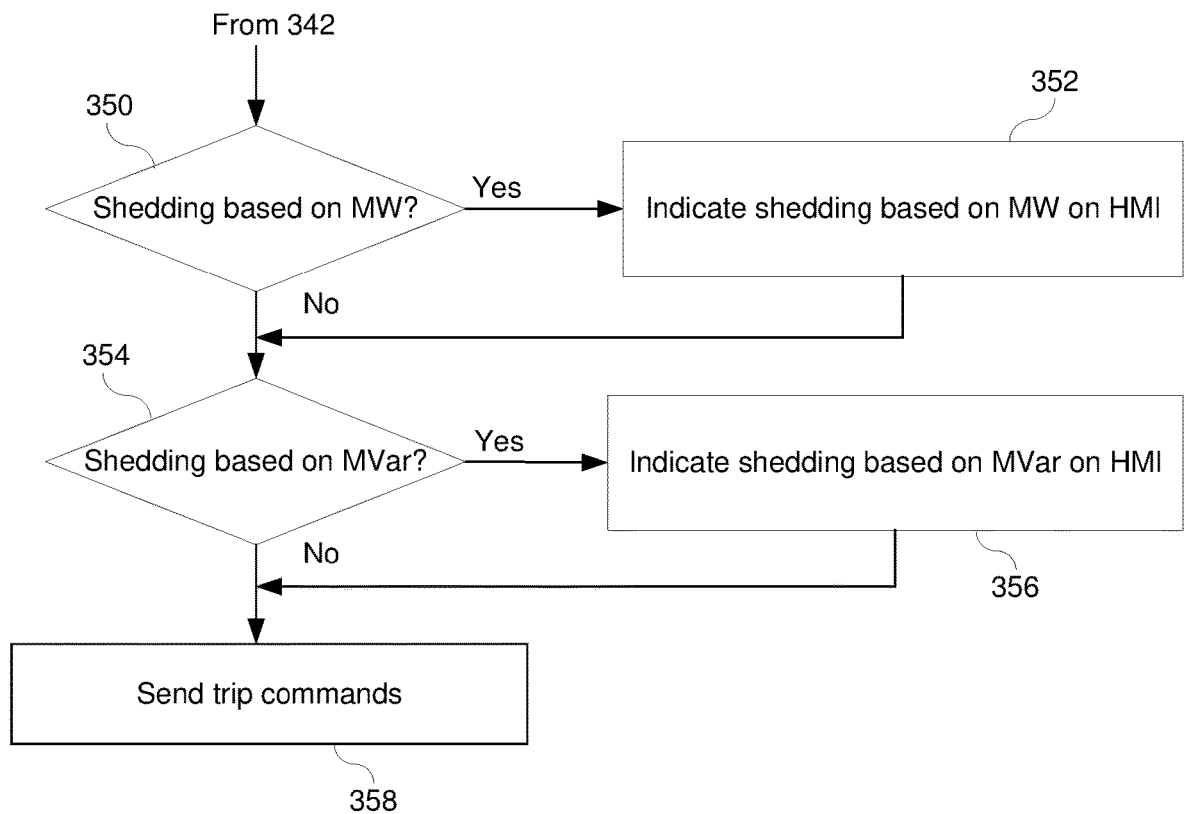
FIG. 5B illustrates a flow diagram of a second part of the process performed by the monitoring and control system of FIG. 2, in accordance with embodiments of the present disclosure.

FIG. 5B is a continuation of the process 300 from block 342. Upon solving the active and reactive power load shedding model, the processor 200 may determine whether the loads selected to be shed are based on active power (block 350). The processor 200 may indicate, via the display 206, that one or more loads may be shed based on the active power deficiency (block 352). The processor 200 may determine the loads to be shed are based on reactive power (block 354). Further, the processor 200 may indicate, via the display 206, that one or more loads may be shed based on the reactive power deficiency (block 356). That is, the processor 200 may identify whether the load is being shed based on MW or MVAR balancing. While load shedding is used as an example, generation shedding or a combination of both may be used in balancing the electric power delivery system 100.

The processor 200 may send, via the network interface, a signal to one or more IEDs to cause the IED to trip one or more circuit breakers in the electric power delivery system 100 (block 358). For example, the processor 200 may send the trip command via a transceiver of the electronic device 198 to a transceiver of the IED to cause the IED to open the circuit breaker to shed the load.

Systems and methods described above may shed loads based on both active power and reactive power on each of the buses in the system in the event that a contingency occurs. By shedding loads based on the reactive power and active power, the monitoring and control system may perform control operations to prevent voltages in the power delivery system from exceeding or falling below desired operating ranges (e.g., voltage collapses). Further, sufficient the speed and stability of the power system may be achieved for shedding loads based on the active power and reactive power by using linear optimization. For example, the monitoring and control system may determine which loads to shed in one control cycle time (e.g., within 2 ms) or within a limited number of control cycles (e.g., within 4 ms). The linear optimization in the embodiment described above uses a set of constraints and an objective function to maximize the active power while considering load priority. Further, the objective function may include the breaker condition as a discrete value. That is, the load shedding model determined using the objective function described above may allow for tripping or not tripping in the solved active and reactive power load shedding model without solutions that involve partial trips in which some loads on a circuit breaker are tripped without tripping the remaining loads on the circuit breaker.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory computer readable medium comprising instructions that, when executed by a processor, cause the processor to perform operations comprising:
   receiving electrical measurements of a power system;
   determining active power constraints of the power system based on an operating mode of a governor, an exciter, or both, of each generator in the power system;
   determining reactive power constraints of the power system based on the operating mode of the governor, the exciter, or both, of each generator in the power system;
   determining active power and reactive power of each bus in the power system based on the received electrical measurements;
   optimizing an objective function based on the active power of each bus while satisfying the active power constraints and the reactive power constraints; and
   sending a command to trip at least one breaker to cause the at least one breaker to shed a load based on optimizing the objective function.

2. The non-transitory, computer readable medium of claim 1, bpo79 comprising instructions that, when executed by a processor, cause the processor to perform operations comprising linearly optimizing an objective function.

3. The non-transitory, computer readable medium of claim 2, wherein the objective function comprises a maximization of the active power loads after the contingency.

4. The non-transitory, computer readable medium of claim 1, wherein the active power constraints and the reactive power constraints vary depending on whether the operating mode is an isochronous mode, a droop mode, or a constant megawatt (MW) mode.

5. The non-transitory, computer readable medium of claim 1, wherein the reactive power constraints vary depending on whether the operating mode is a voltage mode, a constant megavolt-ampere reactive (Mvar) mode, a power factor (PF) mode, or a voltage droop mode.

6. The non-transitory, computer readable medium of claim 1, comprising instructions that, when executed by a processor, cause the processor to perform operations comprising determining which loads to shed based at least in part on weighing the loads according to priority.

7. The non-transitory, computer readable medium of claim 1, comprising instructions that, when executed by a processor, cause the processor to perform operations comprising:
   using a first equality constraint as the reactive power constraint when a first generator is operating in a first operating mode; and
   using a second equality constraint as the reactive power constraint when the first generator is operating in a second operating mode.

8. The non-transitory, computer readable medium of claim 1, comprising instructions that, when executed by a processor, cause the processor to perform operations comprising:
   setting reactive power of the first generator to a reactive power generation limit value of the first generator when the reactive power of the first generator reaches the reactive power generation limit value; and
   setting the operating mode of the first generator to a different operating mode when the reactive power generation limit value is reached.

9. A monitoring and control system, comprising:
   memory; and
   a processor operatively coupled to the memory, wherein the processor is configured to:
      determine active power constraints of a power system based on an operating mode of a governor, an exciter, or both, of each generator in the power system;
      determine reactive power constraints of the power system based on the operating mode of the governor, the exciter, or both, of each generator in the power system;
      determine one or more loads to shed to optimize an objective function while satisfying the active power constraints and reactive power constraints of the power system; and
      send a signal to cause a circuit breaker to trip to shed the one or more loads.

10. The monitoring and control system of claim 9, wherein the processor is configured to:

obtain the active power constraints of each generator in the power system that represent lower limits and upper limits of active power generated by each generator; and determine the one or more loads to shed to meet the active power constraints of each generator.

11. The monitoring and control system of claim 10, wherein the processor is configured to determine the one or more loads to shed by determining an active power of each generator based on the active power constraints and the operating mode of the generator.

12. The monitoring and control system of claim 9, wherein the reactive power constraints of each generator in the power system comprise lower limits and upper limits of reactive power generated by each generator.

13. The monitoring and control system of claim 12, wherein the processor is configured to determine the one or more loads to shed by determining a reactive power of each generator based on the reactive power constraints and the operating mode of the generator.

14. The monitoring and control system of claim 9, wherein the processor is configured to receive load active power and load reactive power of each bus in the power system.

15. The monitoring and control system of claim 9, wherein the processor is configured to maximize weighted values of active power loads in the power system while satisfying the voltage constraints.

16. A method, comprising:
  determining inequality constraints of a power delivery system based on user inputs;
  determining equality constraints of the power delivery system based on active power and reactive power of each bus in the power delivery system; and
  determining one or more loads to shed based on an objective function of the power delivery system while satisfying the inequality constraints and the equality constraints of the power delivery system, wherein the objective function comprises:
where $N_L$ is a number of loads in a set of loads in the power delivery system, $W_i$ is a weight factor of load i, $PL_i$ is an active power of load i, and $Brk_i$ is a breaker status of load i.

17. The method of claim 16, wherein the inequality constraints comprise voltage constraints of each bus in the power delivery system, active power generation constraints of each generator in the power delivery system, reactive power generation constraints of each generator in the power delivery system, or any combination thereof.

18. The method of claim 16, wherein the equality constraints comprise a constraint that is based on the operating mode of a generator in the power delivery system.

* * * * *